F. R. HONEY.
Parallel-Ruler.
No. 221,559. Patented Nov. 11, 1879.
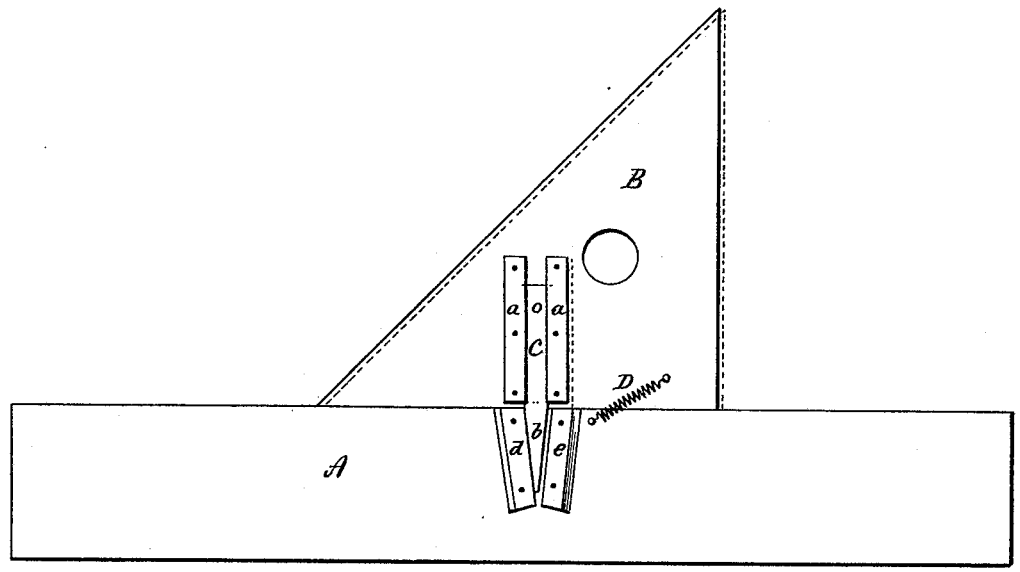

United States Patent Office.

FREDERIC R. HONEY, OF NEW HAVEN, CONNECTICUT.

IMPROVEMENT IN PARALLEL RULERS.

Specification forming part of Letters Patent No. 221,559, dated November 11, 1879; application filed October 15, 1879.

*To all whom it may concern:*

Be it known that I, FREDERIC R. HONEY, of New Haven, in the county of New Haven and State of Connecticut, have invented a new Improvement in Parallel Rulers; and I do hereby declare the following, when taken in connection with the accompanying drawing and the letters of reference marked thereon, to be a full, clear, and exact description of the same, and which said drawing constitutes part of this specification, and represents a plan view.

This invention relates to an improvement in instruments for mechanical drawing designed as a guide for making parallel lines, and with special reference to the work commonly called "section-lines;" and the invention consists in the construction, as hereinafter described, and particularly recited in the claim.

A is a bar, its two edges parallel to each other; B, an angle-piece, preferably of the same thickness as the bar A. C is a sliding piece arranged between guides $a$ $a$ on the angle B, and so as to project over onto the bar A in shape of a taper tongue, $b$, and on the bar A are two stops, $d$ $e$, one each side of the tongue $b$, and corresponding to the inclined sides of the tongue.

If the slide C be forced onto the bar A until the tongue $b$ strikes both of the stops $d$ $e$, then the angle will be prevented from moving; but if the slide C be drawn back so as to leave a slight space, as shown in the drawing, then the angle may be moved on the bar to that extent, as indicated in broken lines. This completes the instrument.

The operation is as follows: The draftsman, having adjusted the slide C so as to permit movement of the angle to the required extent, places the instrument upon the paper, holding the bar A, and, pressing the angle B forward until the tongue bears against the stop $d$, makes one line along the edge of the angle; then, still holding the bar A, moves the angle B until the tongue $b$ strikes the stop $e$, and, as noted in broken lines, then makes a second line along the same edge of the angle as before, which will be distant from the first according to the distance the angle was moved; then, holding the angle B, he moves the bar A until the stop $d$ comes against the tongue; then holds the bar and moves the angle until the tongue comes against the stop $e$, and in that condition makes the third line, and thus, moving the bar and angle step by step, is enabled to make a succession of parallel lines equidistant from each other.

By moving the slide C into or from the stops $d$ $e$ the distance to which the parts may be moved may be varied; hence the instrument is adjustable to making the parallel lines differently spaced; but when set in any position all the lines made in that condition will be equally spaced.

As an aid to the movement of the parts, a spring, D, is attached by one end to the angle and the other to the bar, the tendency of the spring being to draw and hold the parts together until one stop meets its side of the tongue $b$, so that, for instance, if the bar A be held until the angle has been moved, then the angle held and the bar released, the spring will bring the bar up to its place against the tongue.

While describing the lines as made against one edge of the angle, they may be made against the opposite edge, or may be made against one edge of the bar, the angle being held on the guide, and so that the bar will present the required angle.

I claim—

The herein-described parallel ruler, consisting of the bar A, the angle B, the slide C on one part extending to form the tongue $b$ over the other part, and between two stops on the said other part, substantially as described.

FREDERIC R. HONEY.

Witnesses:
J. H. SHUMWAY,
JOS. C. EARLE.